United States Patent [19]

Bavaro et al.

[11] Patent Number: 4,794,272

[45] Date of Patent: Dec. 27, 1988

[54] POWER REGULATOR UTILIZING ONLY BATTERY CURRENT MONITORING

[75] Inventors: Lee T. W. Bavaro, Manhattan Beach; James W. Bates, Palos Verdes Estates, both of Calif.

[73] Assignee: The Aerospace Corporation, El Segundo, Calif.

[21] Appl. No.: 5,058

[22] Filed: Jan. 20, 1987

[51] Int. Cl.$^4$ .............................................. H02J 7/00
[52] U.S. Cl. ....................................... 307/66; 307/64; 320/15; 320/23; 363/95
[58] Field of Search .................... 307/64, 66, 46, 112, 307/113, 115; 323/906, 299, 300; 320/32, 39, 43, 48; 60/659, 641.8; 136/293

[56] References Cited

U.S. PATENT DOCUMENTS

| | | | |
|---|---|---|---|
| 3,696,286 | 10/1972 | Ule | 323/906 X |
| 3,816,804 | 6/1974 | Cardwell | 307/66 X |
| 4,052,656 | 10/1977 | Lavell et al. | 320/39 X |
| 4,163,194 | 7/1979 | Ross | 323/906 X |
| 4,175,249 | 11/1979 | Gruber | 307/66 X |
| 4,204,147 | 5/1980 | Larrabee | 323/906 X |
| 4,287,465 | 9/1981 | Godard et al. | 307/66 X |
| 4,313,078 | 1/1982 | Bilsky et al. | 323/906 X |
| 4,375,662 | 3/1983 | Baker | 323/906 X |
| 4,494,063 | 1/1985 | Callen et al. | 307/66 X |
| 4,595,872 | 6/1986 | Ball | 307/66 X |

OTHER PUBLICATIONS

"Standard Power Regulator for the Multi-Mission Modular Spacecraft" by Space Power Application Branch, Engineering Conference, Boston, Mass., (Aug. 5-10, 1979).

Primary Examiner—William M. Shoop, Jr.
Assistant Examiner—Paul Ip
Attorney, Agent, or Firm—William J. Burke

[57] ABSTRACT

For a power system having a single maximum power point and varying loads, the present invention provides a power regulator which adjusts the operating point of one source as a function of only the sensed current conditions of the secondary source.

In the preferred embodiment, a solar array is controlled by a regulator which determines whether the battery is properly charging. Upon the occurrence of an undercharging condition, the array operating point is adjusted so as to minimize undercharge current. Upon the occurrence of a charging condition, the operating point is adjusted so as to continue battery charging according to predetermined limits.

6 Claims, 4 Drawing Sheets

POWER REGULATOR UTILIZING ONLY BATTERY CURRENT MONITORING

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

The invention relates in general to output power switching regulators for power sources containing a single maximum power point, and relates in particular to regulators where the primary power source is combined with a secondary power source, such as a battery.

The invention is of special relevance with respect to battery augmented solar array power systems in which control signals from the pulse width modulated power regulator are essentially derived from a monitoring of an output current such as the battery current. The nominal system condition has the solar array supplying power through a regulator to a varying load while also supplying power to charge the battery.

While the subject invention will be described with reference to particularized embodiments and end uses, the invention is not limited to such embodiments and uses. Those having ordinary skill in the art and access to the teachings of this specification will recognize additional implementations and utilizations within the scope of the invention.

2. Background Art

In any system containing multiple power sources, a regulator is used to determine how the power sources will be used to satisfy the load demands for power. If the available power from the primary power source exceeds the demand, the regulator can be used to adjust that power source to operate at a point below maximum capability. If the load exceeds the power available from the primary power source, the regulator can adjust the primary power source to operate at its maximum power point and use the secondary power source to satisfy the excess demands.

An example of such a system is one where the primary source is a solar array and the secondary source is a battery. If the solar array fully satisfies the demand by the loads for power, the regulator maintains the battery in a fully-charged, ready condition. If the array is unable to satisfy the demand loads, the regulator adjusts the array to operate at the maximum power point, and the battery then supplies the remaining load demand. However, it is critical that the regulator be able to quickly determine whether the loads exceed the capabilities and adjust accordingly.

The prior art discloses several techniques for locating the maximum power point. All techniques are based on the mathematical relationships between power P, voltage V and current I:

$$P = V \times I \text{ and thus } \frac{dP}{dt} = V\frac{dI}{dt} + I\frac{dV}{dt}$$

In particular, the maximum power point can be located by setting $$\frac{dP}{dt} = 0.$$

However, in order to provide real time adjustments of the operating point, this equation must be solved quickly. This is difficult because solving this equation requires at least eight calculations and measurements: (1) a determination of present array voltage V; (2) a determination of present array current I; (3) a measure of the change in voltage, dV, in the face of a given operating point perturbation (dt); (4) a measure of the change in current, dI, corresponding to the operating point perturbation; (5) a calculation of the product $V \times dI$; (6) a calculation of the product $I \times dV$; (7) a calculation of the resulting sum $VdI + IdV$; and (8) a comparison of this sum to an equal perturbation on the opposite side of the operating point or the operating point power. Furthermore, if the final sum is not zero, a ninth determination must be made of the sign of the dP sum. This sign indicates the direction that the operating point must be adjusted to reach the maximum power point.

Prior art regulators take at least three general approaches to solving this complex equation: trial and error techniques using (1) analog or (2) digital processing; or (3) an a priori technique based on a known reference. All of these techniques rely heavily on simplifying assumptions.

The first approach solves this equation using a trial and error technique to locate the peak power point. This technique is based on the fact that the output power of the solar array is a continuous function of voltage and current with a single peak power point. The technique uses analog circuits and involves iteratively perturbing the array voltage and current, known as the operating point, monitoring the change in array voltage and current, noting resultant changes in array output power, and steering the operating point to a point where until such changes are found to be essentially equal. That point is the maximum power point.

The major problem with analog processing of solar array output parameters is the sensitivity of voltage and current sensors to noise. These sensors must have a wide dynamic range but the signal of interest may only change minutely. Using the current sensor as an example, a first current sensor would measure on a scale from 0 amperes to 50 amperes; a second would measure on a scale from 0 amperes to 1 ampere with a variable bias of up to 50 amperes. The bias would have to settle down for a fixed time to insure little error.

In addition to the problem of noise sensitivity, this approach is limited by the complexity of regulator input and output voltage and current sensors, as well as the complexity of the calculation of the power function.

In the digital approach, information from sensors is gathered from analog sensors. The equation is solved digitally by some form of computer and control signals are returned to the regulators. Digital systems also have major disadvantages. They require analog-to-digital conversion modules, computation memory modules and reverse digital-to-analog conversion modules and other hardware. In addition to the direct cost of such equipment, the intrinsic weight, volume and power consumption penalties can be especially disadvantageous in such critically limited operational environments as spacecraft.

Another important disadvantage of digital processors is the resultant slow speed at which such systems perform the required operating point movement. The total amount of time required for complete cycles of (1) pre-calculation analog-to-digital conversion of sensed analog parameters, (2) memory access and transfer of computationally-required stored parameters, (3) actual microprocessor calculations, (4) retransfer to memory of calculation results, and (5) post-calculation digital-to-analog conversion of resultant control parameters, can make the microprocessor approach quite slow. The result is that the overall system will be inefficient when power demands are most critical.

Finally, the a priori approach uses information from tests of solar cells or test of arrays similar to the controlled solar array and moves the operating point to the predicted peak power point. Serious errors can result if the conditions of test vary from the application. Since peak power points change with life, heat, light intensity, shadowing and a host of other parameters, this technique has not been widely used.

It is accordingly a general object of the present invention to significantly improve the overall performance of the primary power source in a system containing multiple power sources.

It is a more specific object of the present invention to significantly improve the net system efficiency of the output power regulators in such systems.

It is a further specific object of the present invention to increase the speed of such regulators so as to thereby increase associated overall system responsiveness to rapid fluctuations in operational conditions.

It is a still more specific object of the present invention to reduce the complexity and noise sensitivity of a regulator by sensing the input current of the battery.

It is yet another object of the present invention to reduce the associated cost, weight, volume and power consumption of required regulator components.

SUMMARY OF THE INVENTION

The present invention provides a power regulator which adjusts the operating point of the power source as a function of the sensed output current.

The subject regulator is determines whether the battery is in the required charging condition. Upon the occurrence of an undercharging condition, the array operating point is adjusted so as to minimize battery undercharge current. Upon the occurrence of an overcharging condition, the operating point is adjusted so as to continue battery charging according to predetermined battery specific voltage-temperature or current limits.

The regulator preferably includes (1) a switching converter between solar array and load, (2) a means for altering the duty cycle of the converter so as to effect the desired battery charge condition, and (3) a means for dithering (perturbing) the duty cycle of the battery to determine the location of the operating point.

The regulator may also be configured so as to determine whether a given present operating point is located in the voltage-variation portion or current-variation portion of the array operational spectrum, and then to effect an operating point movement to the desired portion.

DETAILED DESCRIPTION OF THE PREFERRED EMBODIMENT

Figure 1:
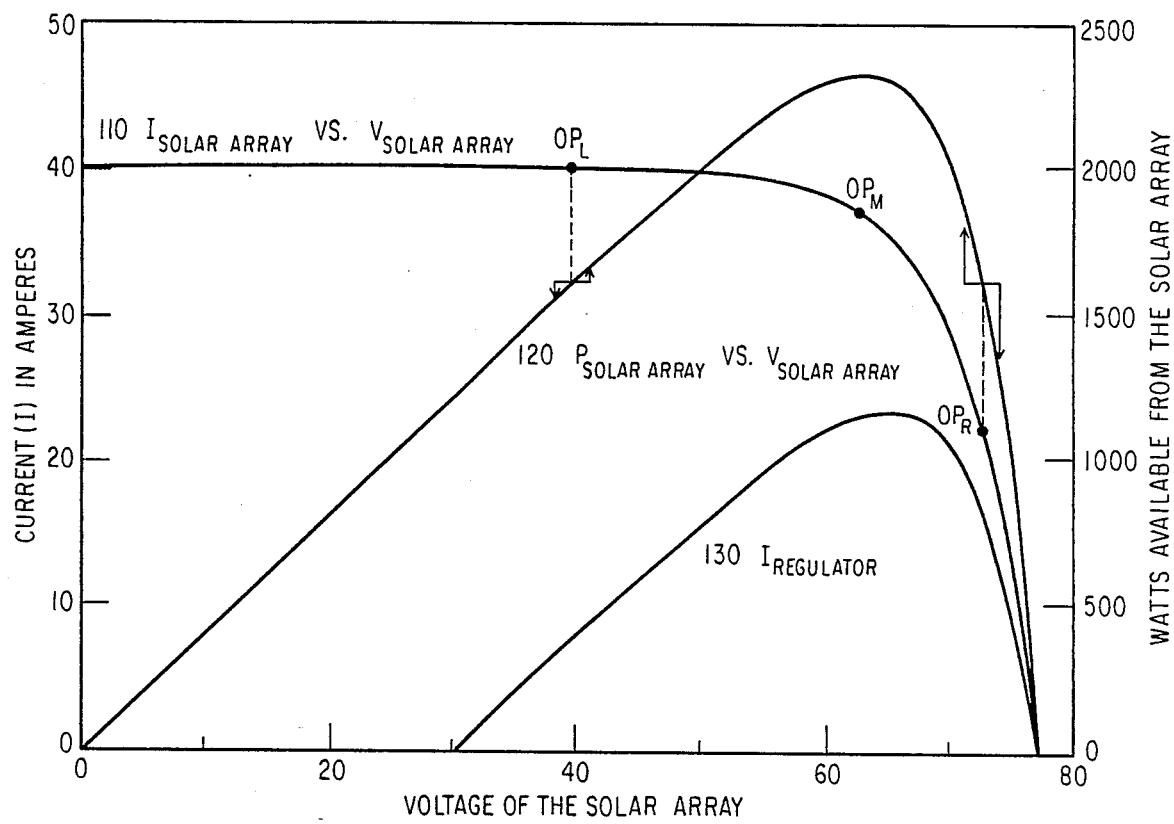
FIG. 1 generally shows the relationship between array output voltage and current (curve 110), power (curve 120) and regulator current (curve 130).

Referring to FIG. 1, curve 110 represents a typical characteristic for a subject solar array and generally indicates the relationship between array output voltage and current. The companion curve 120, plotted as a function of voltage, represents the array output power associated with the 110 characteristic and is obtained by forming the product of current and voltage ($I \times V$) for each pair of current and voltage values along the 110 curve. Curve 130 shows the regulator current available to charge the battery with a relatively constant load.

The array output power is maximum at a "knee" point $OP_M$ on curve 110 where neither the array current nor the voltage are individually maximum. Furthermore, at operating points such as $OP_L$ on curve 110 which are to the left of the point of maximum power, the current is greater and the voltage is less than they are at maximum power. The opposite is true for points such as $OP_R$ which are to the right of the maximum power point. It is noted that for an equal change in array voltage at those operating points, the associated change in array current, and hence the in-turn associated change in output power, is significantly greater for $OP_R$-type points to the right of maximum than for $OP_L$-type points. Other aspects of the illustrated characteristic will be discussed subsequently.

Figure 2:
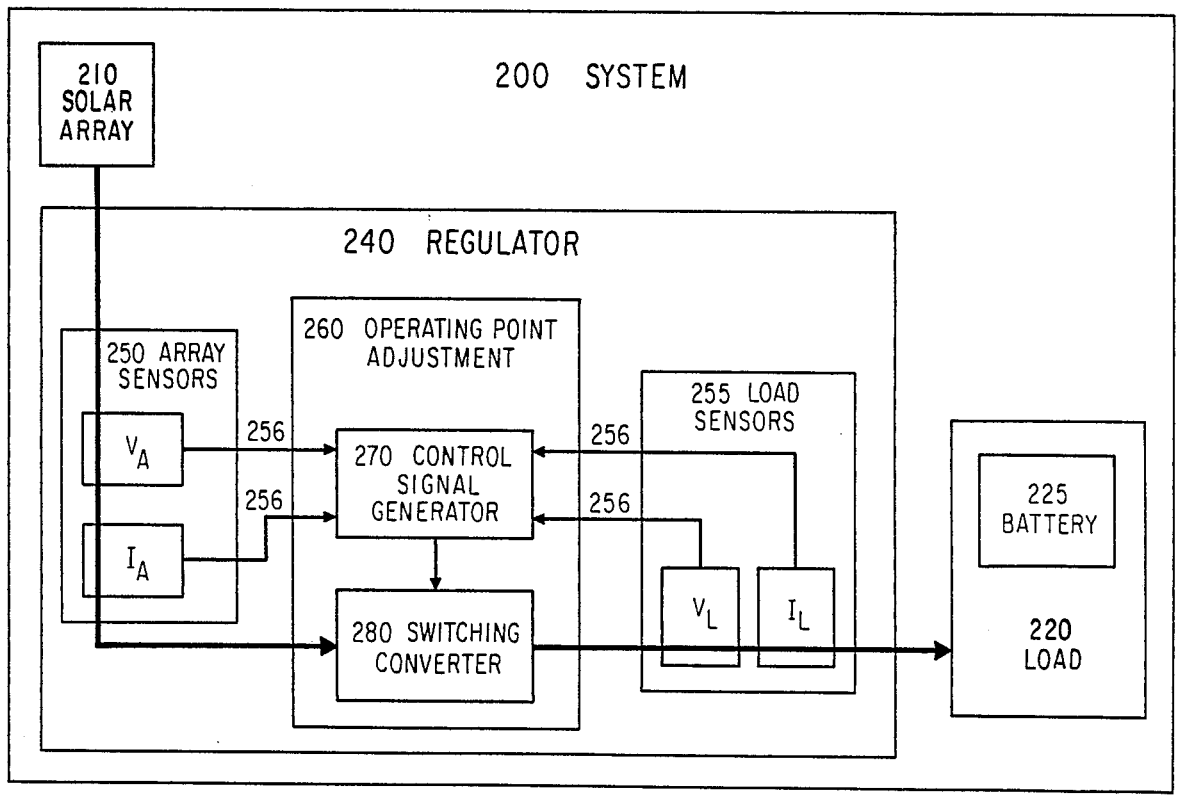
FIG. 2 generally shows a typical solar array/battery power system with a conventional regulator in which only sensed array output power parameters are employed to determine the peak power point of the array.

The present invention can be best understood following a short description of the prior art. In the analog and digital prior art systems, the information on the peak power point is derived from the input to the regulator and not from the output. FIG. 2 shows a conventional solar array driven power system 200 having a photovoltaic solar array 210 and an output load 220. System 200 also includes an augmentation battery 225 for supplying needed power to the load under conditions where load demands exceed a given presently generated array output-power level. Battery is charged from output array power and discharged by the load demands in excess of available array power. Because the array is typically operated over a range of current-and-voltage combinations which are different from load voltage and current or the voltage of battery, system 200 also includes a regulator 240.

Regulator 240 converts power supplied under the current and voltage combination established by a given array operating point to the current and voltage that is compatible with the load and battery. Regulator 240 causes the operating point of array 210 to be adjusted in an attempt to fully satisfy the power requirements of load 220 and battery as measured by load sensors 255. Regulator 240 employs only solar array output voltage and current parameters to make array operating point adjustments under conditions of heavy loading. Regulator 240 includes array output sensors 250 and load condition sensors 255. The voltage readings from the array and the load, $V_A$ and $V_L$, and current readings from the array and the load, $I_A$ and $I_L$, respectively, are fed over sensor lines 256 to the control signal generator 270. The control signals produced by generator 270 are then used to alter the power conversion action of array output switching converter 280 so as to achieve the desired array operating point of the operating point adjustment circuit 260.

For example, in a situation where the voltage of load 220 was 20 volts, the load current demand was 67.5 amperes and associated losses were 250 watts, array 210 would be required to produce [(20 volts x 67.5 amperes) +250 watts]=1600 watts to fully meet load requirements. As shown in FIG. 1, the operation of power converter 280 would be controlled to adjust the array 110 operating point to some point $OP_L$, where the 40 array volts and 40 array amperes would produce the needed 1600 watts of array output. $OP_R$ could be chosen in a similar fashion.

Figure 3:
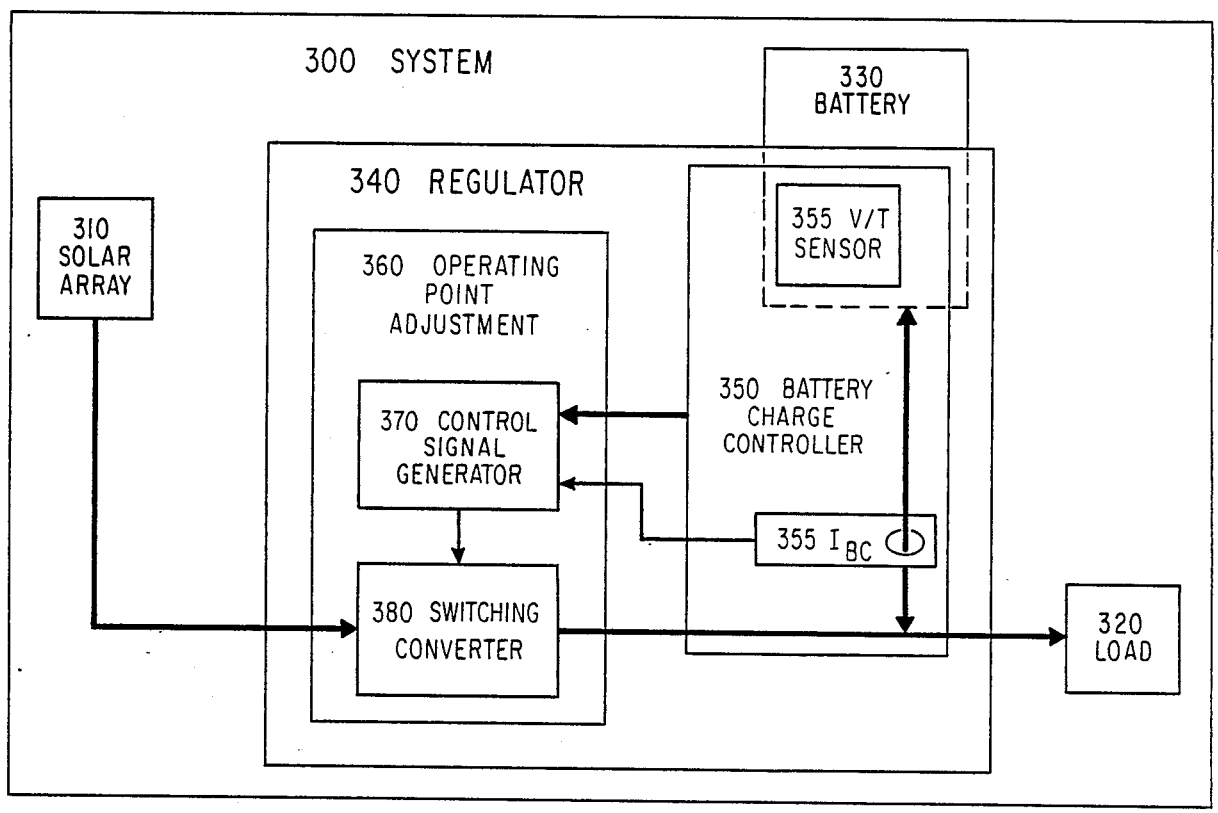
FIG. 3 generally shows a solar array/battery power system with a novel regulator which determines the peak power point of the array as a function of the regulator output current.

With regard now to the present invention as generally depicted in FIG. 3, the inventive solar array/battery power system 300 includes the conventional photovoltaic solar array 310, output load 320, and an array-charged, load discharged battery 330. The array output power regulator 340 similarly includes an array operating point adjustment network 360 with the array output switching converter 380 and conversion signal generator 370. Regulator 340 also includes a battery charge controller 350 whose signals are sent to adjustment network 360 which adjusts the operating point of the array as a function of sensed battery conditions. In contrast with the regulator shown by FIG. 2, however, regulator 340 shown in FIG. 3 performs the operating point adjustments and load regulation as a function of readings from only the battery current sensor $I_{BC}$ 355. Array output and load parameters are not used. The information is also contained in current loop 70 of FIG. 7 so choice of battery current, ($I_{BC}$), is not unique. Battery current was chosen for simplicity.

Figure 4:
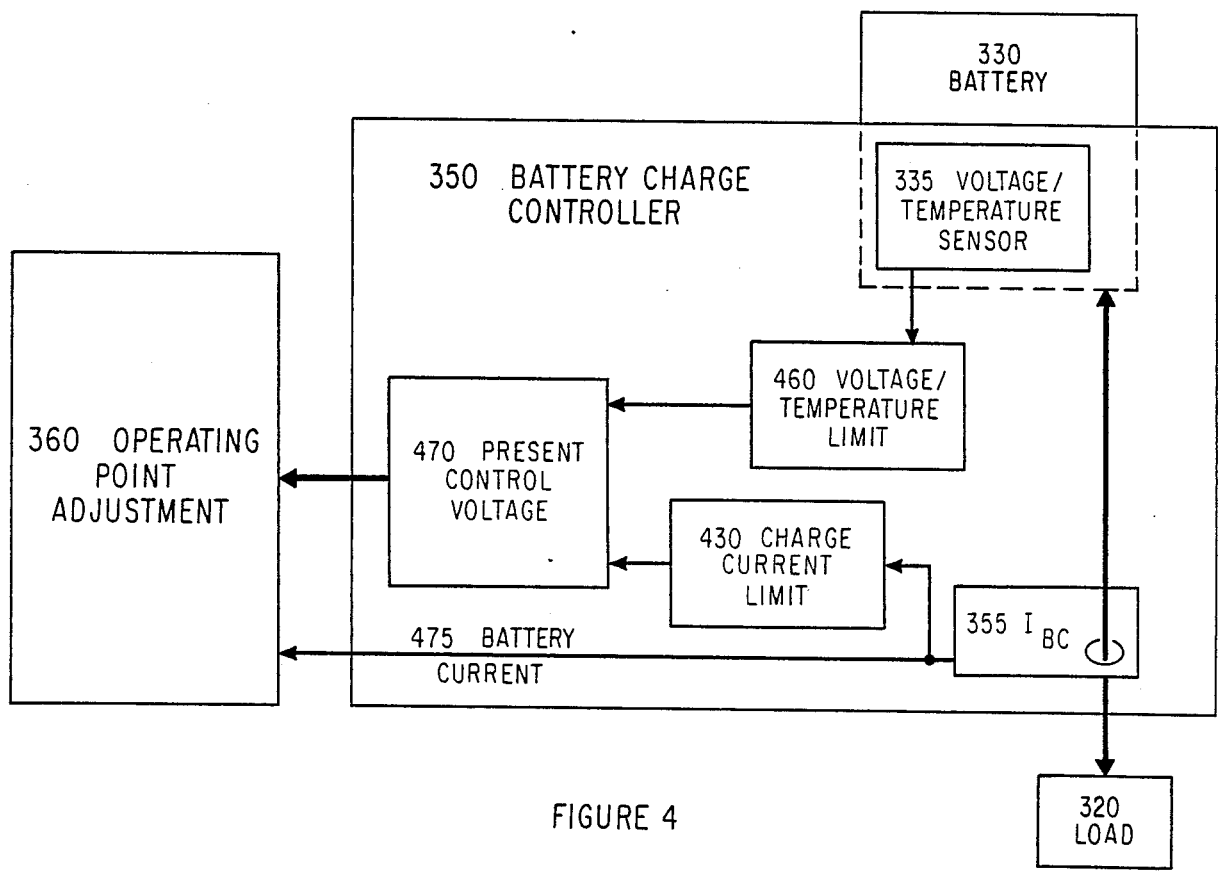
FIG. 4 generally shows various more specific elements of the battery charge controller 350 of FIG. 3.

FIG. 4 thus generally shows various more specific elements of a preferred realization for the battery charge controller 350 of FIG. 3. The usual battery charge controller charges a battery at a fixed current limit until a limit proportional to voltage and temperature (V/T) is reached. Then the V/T limit is used to taper charge to some minimum level. Controller 350 includes a required battery charge current limit 430, a voltage/temperature limit 460, and the current sensor 355. The current monitored by battery charge and discharge current sensor 355 is compared to the current limit 430 and the V/T sensor reading 335 to the V/T limit 460. A present control voltage 470 based on the comparisons is sent to the control signal generator 370 of the operating point adjustment network 360. The current sensor signal 475 is also supplied to the control signal generator 370.

Figure 5:
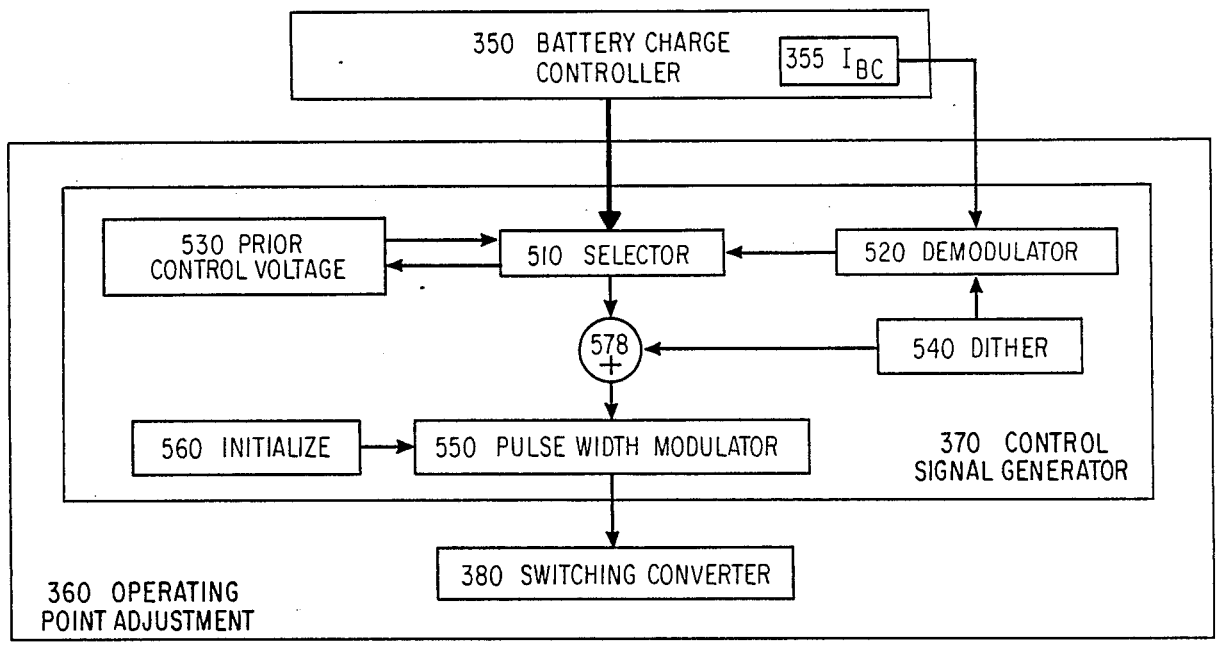
FIG. 5 generally shows various more specific elements of the operating point adjustment network 360 of FIG. 3.

The operating point adjustment system 360 is shown in FIG. 5. Each control voltage is proportional to a unique duty cycle. The selector 510 chooses the final control voltage based on a steering signal from demodulating 520. The demodulator 520 compares battery current during the dither cycle and decides whether the operating point is on the correct side of the characteristic curve 120. The correct side is arbitrary but for speed considerations the side to the right of the peak power point $OP_M$ was chosen. If the demodulator 520 produces an "OK, the operating point during dither is on the correct side," the selector 510 passes the present control voltage to the summing junction 578; otherwise it sends the prior voltage 530.

The switching converter 380 of FIG. 3 is preferably driven by a pulse width modulator 550. The selector 510 is diode OR'd 758 with the fixed amplitude dither signal 540. In this manner the control voltage is perturbed to produce battery condition alterations indicative of present array operating point locations.

The combined control voltage and dither is then fed to pulse-width modulator 550 for the actual control of converter ON switching time. It is more particularly at modulator 550 that the dither's minute variations in the ON periods are implemented. It is also at modulator 550 that the input of switching converter 380 and hence the voltage operating point of array 310 is initialized by unit 560 to an arbitrary predetermined operating point based on system considerations.

Figure 6:
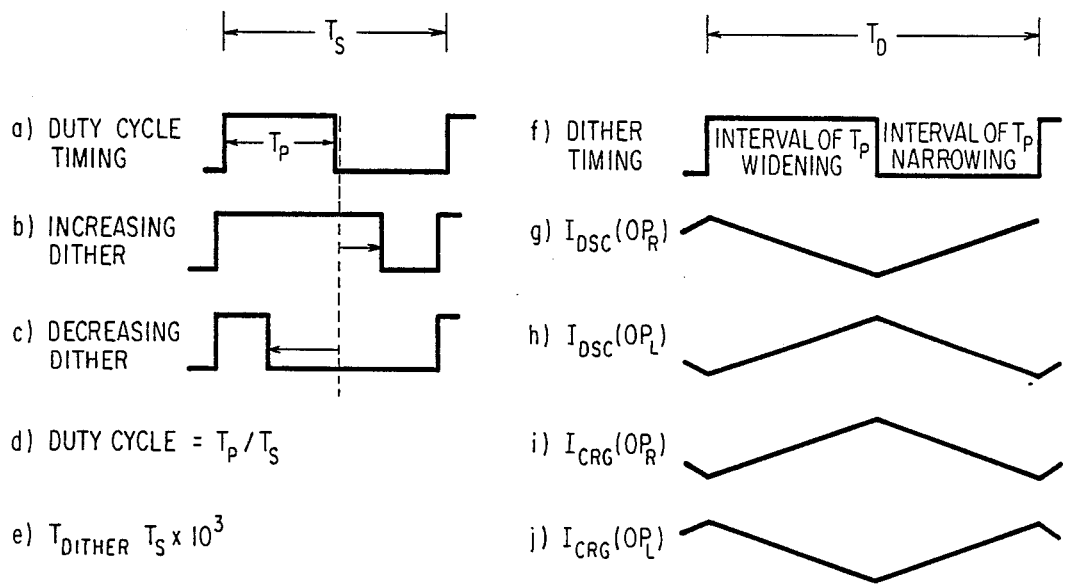
FIGS. 6a thru 6j illustrate various aspects of the switching dither, and resultant battery current signals associated with regulator operating point adjustment operations.

FIGS. 6a thru 6j illustrate various aspects of the switching dither, and resultant battery current signals associated with regulator operating point adjustment operations. FIG. 6a thus shows the basic features of the duty cycle timing of switching converter 380 in FIG. 3. The converter is shown to possess a fundamental switching period $T_S$, which for typical networks may be on the order of 100 kHz. The commanded O period $T_P$ is some subinterval of $T_S$. FIG. 6b represents a dither induced expanded ON period, while FIG. 6c represents a dither induced ON period reduction. FIG. 6d represents the basic differential relationship for a duty cycle in the present switching converter context, and FIG. 6e presents an example of the order of magnitude relationship between typical switching periods $T_S$ and the next discussed dither periods $T_D$.

Basic aspects of dither timing are presented in FIG. 6f where a fundamental dither signal period $T_D$, typically on the order of 1 kHz, is shown to possess a first subinterval during which a widening of switching ON period $T_P$ is effected, followed by a second subinterval during which a narrowing of $T_P$ is then alternately effected. The practical operational result of a dithering cycle FIG. 6e and FIG. 6f is that first several thousand successive converter switching cycles will have their ON periods widened, after which an equal thousands order number of such switching cycles will experience an ON period narrowing. FIG. 6g and FIG. 6h then respectively show the resultant high-to-low-to-high and low-to-high-to-low battery discharge current, $I_{DSC}$, patterns associated with such dither sequencing. FIG. 6g shows the pattern that results under an $OP_R$-type condition of load-excess, array-deficiency, and FIG. 6h shows the pattern that results under the analogous $OP_L$-type condition. Similarly, FIGS. 6i and 6j show the resultant low-to-high-to-low and high-to-low-to-high battery charge current, $I_{GRG}$, patterns associated with such dither sequencing under the $OP_R$ and $OP_L$-type conditions of array load-sufficient, battery-charging. It is to be again noted that as a direct consequence of curves 110, 120 and 121 in FIG. 1, the general magnitude of the subject current changes, delta(I), is significantly greater for operating points to the right of maximum, and thus current to or from the battery. At the peak power point the difference is not significant on either side.

Referring to FIG. 5, suitable and otherwise conventional processing techniques may then be employed to analytically process the various resultant battery current patterns so as to yield appropriate directional indications for selecting valid control voltages in selector 510. Such processing can be performed by synchronously comparing currents at the middle and end of the dither cycle or a circuit using a suitable demodulator 520.

Figure 7:
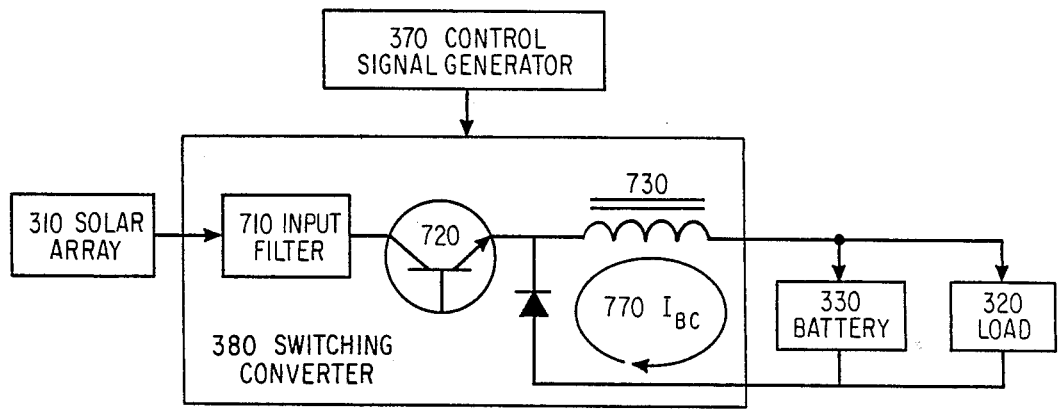
FIG. 7 generally shows an example realization of the switching converter 380 of FIG. 3.

FIG. 7 generally shows an example realization of the switching converter 380 of FIG. 3. The conventional circuit illustrated includes input filter 710, basic switching transistor 720, energy storage choke 730, and return diode 740. Choke 730 and diode 740 are elements in current loop $I_{BC}$ 770. Input filter 710 is used to limit array voltage swing during switching.

As a subsystem to operating point adjustment network 360 shown in FIG. 3, filter 710 charges toward VOC whenever the switch is OFF. By turning the switch OFF for a predetermined period using initialization unit 560 the operating point can be initialized at any point convenient for the total system. Initialization unit 560 consists of a simple resistor-capacitor combination with a time delay of about 3 to 300 milliseconds depending on solar array size. Most switching converter control chips have a port where this resistor-capacitor combination is attached. For example, a Unitrode Corp. 1524A, pin 15, can be used to keep the converter off until the input filter 750 charges to the open circuit voltage of the solar array. For example, for a system working to the right of $OP_m$ initialization would allow the filter to charge to VOC; a system on the left side might initialize at a point just above (battery voltage +10%).

The preceding description has presented in detail exemplary preferred ways in which the concepts of the present invention may be applied. Those skilled in the art will recognize that numerous alternatives such as dual systems encompassing many variations may readily be employed without departing from the spirit and scope of the invention as set forth in the appended claims.

We claim:

1. A combination comprising:
    A. A primary power source containing a maximum power point;
    B. A load;
    C. A secondary power source directly coupled to the load along a single path;
    D. A sensor means located at the secondary power source for measuring a flow of charge through the secondary power source and for producing a single control signal indicative of the flow of charge, whereby the control signal is prepared without mathematically differentiating the control signal or calculating power.
    E. An adjustable means coupling the primary power source to the secondary power source and for transferring power along a single path from the primary source to the secondary power source and the load, responsive only to the control signal received from the sensor means, whereby the flow of charge from the secondary power source is minimized.

2. The combination as claimed in claim 1 wherein the primary power soource is a solar array.

3. The combination as claimed in claim 1 wherein the secondary power source is a battery.

4. The combination as claimed in claim 1 wherein the sensor means measures current.

5. The combination as claimed in claim 1 wherein the adjustable power transfer means is a regulator.

6. A method of automatically determining a maximum power point of a primary power source in a combination comprising the primary power source, a secondary power source, a sensor, a load and an adjustable means for transferring power, comprising the steps of:
    A. Prepositioning an operating point of the primary power source wherein a direction to the maximum power point is determined;
    B. Defining a required flow of charge from the secondary power source to the load, such that the required flow of charge at the voltage of the secondary power source is greater than or equal to the flow of charge of the primary power source at the voltage of the maximum power point;
    C. Measuring the flow of charge through the secondary power source using the sensor to produce a control signal indicative of the flow of charge;
    D. Receiving the control signal from the sensor;
    E. Comparing the control signal to the required flow of charge through the secondary power source; and
    F. Adjusting the flow of charge to approach the required flow of charge, whereby the direction from the operating point of the combination to the maximum power point is uncharged

* * * * *